United States Patent [19]

Schindler

[11] 4,434,048

[45] Feb. 28, 1984

[54] HYDROTREATING CATALYST AND USE THEREOF

[75] Inventor: Harvey D. Schindler, Fairlawn, N.J.

[73] Assignee: The Lummus Company, Bloomfield, N.J.

[21] Appl. No.: 481,776

[22] Filed: Apr. 4, 1983

Related U.S. Application Data

[60] Division of Ser. No. 363,914, Mar. 31, 1982, Pat. No. 4,414,141, which is a continuation of Ser. No. 208,948, Nov. 21, 1980.

[30] Foreign Application Priority Data

Apr. 30, 1983 [JP] Japan .................................. 58-63878

[51] Int. Cl.$^3$ ....................... C10G 45/08; C10G 47/10
[52] U.S. Cl. ............................. 208/112; 208/216 PP; 208/251 H; 208/254 H
[58] Field of Search ........ 208/216 PP, 251 H, 254 H, 208/112

[56] References Cited

U.S. PATENT DOCUMENTS

| | | | |
|---|---|---|---|
| 3,530,066 | 9/1970 | Kuwata et al. | 208/309 |
| 3,966,588 | 6/1976 | Beaty, Jr. | 208/216 PP |
| 4,006,076 | 2/1977 | Christensen et al. | 208/211 |
| 4,013,547 | 3/1977 | Mickelson | 208/216 PP |
| 4,032,433 | 6/1977 | Petri et al. | 208/112 |
| 4,225,421 | 9/1980 | Hensley, Jr. et al. | 208/216 PP |
| 4,257,922 | 3/1981 | Kim et al. | 252/465 |

*Primary Examiner*—Delbert E. Gantz
*Assistant Examiner*—O. Chaudhuri
*Attorney, Agent, or Firm*—Elliot M. Olstein; Louis E. Marn

[57] ABSTRACT

A catalyst for hydrotreating of heavy feedstocks comprised of nickel and molybdenum, supported on alumina having a defined pore size distribution which has been calcined at a temperature of from 1150° F. –1300° F. Calcining of such catalyst at such temperatures is required in order to provide for effective use thereof as a hydrotreating catalyst for higher boiling feedstocks.

8 Claims, No Drawings

HYDROTREATING CATALYST AND USE THEREOF

This is a division of U.S. application Ser. No. 363,914, filed Mar. 31, 1982, U.S. Pat. No. 4,414,141, which is a continuation of U.S. application Ser. No. 208,948, filed on Nov. 21, 1980.

This invention relates to hydrotreating, and more particularly to an improved hydrotreating catalyst, and the use thereof.

In the hydrotreating of hydrocarbon containing feedstock, such hydrotreating is generally accomplished in the presence of a hydrotreating catalyst comprised of Group VI and Group VIII metals supported on a suitable support. There is a continued need for improvements in such catalysts so as to provide improved activity and longer catalyst life.

In accordance with one aspect of the present invention, there is provided an improved hydrotreating catalyst which is comprised of catalytically effective amounts of nickel and molybdenum supported on alumina wherein the catalyst has a total porosity of at least 0.5 cc/g and most generally from 0.75 to 0.95 cc/g, a pore size distribution as defined in the following table and wherein the catalyst has been calcined at a temperature of from 1150° F. to 1300° F.

TABLE

| Pore Diameter, Å | Porosity (cc/g) |
|---|---|
| <250 | 0.25–0.40 |
| 250–500 | 0.10–0.25 |
| 500–1500 | 0.20–0.30 |
| 1500–4000 | 0.05–0.15 |
| >4000 | 0.03–0.10 |

Applicant has found that such catalyst has improved hydrotreating activity and improved catalyst life, provided that the catalyst is calcined at such temperatures. Applicant has found that calcining of such catalyst at temperatures normally used for the calcining of supported nickel containing catalysts (about 1000°–1050° F.) does not provide a useable catalyst for the hydrotreating of higher boiling feedstocks in that severe coking of the catalyst occurs after only a short period of operation.

The catalyst is comprised of nickel and molybdenum and may further include cobalt.

The catalyst generally contains from 1% to 6%, preferably from 1% to 4% of nickel; and from 5% to 16%, preferably from 6% to 10% of molybdenum, and 0% to 6% of cobalt, all by weight. If cobalt is employed, the cobalt is generally present in an amount of from 1% to 6%, by weight.

The particle size of the catalyst is generally in the order of from 0.005 to 0.125 inch, with the catalyst, if in extruded form, generally having a size in the order of from 0.015 to 0.125 inch, and if in spherical form a size in the order of from 0.005 to 0.125 inch.

In general, the surface area of the catalyst is at least 125 m$^2$/g, and most generally from 150–300 m$^2$/g. The alumina of the catalyst is generaly the gamma form thereof. In some cases, the alumina support could include up to 10% of silica.

The nickel and molybdenum and optionally also cobalt are supported on the alumina by procedures generally known in the art. Thus, for example, a molybdenum compound, such as ammonium molybdate may be added to an aqueous slurry of the alumina having a porosity and pore size distribution to provide a finished catalyst having the hereinabove defined porosity and pore size distribution, followed by spray drying and formation, for example, into spheres. Optionally the supported molybdenum may be calcined at this time; however, such calcining would be additional to and not in lieu of the final calcination in accordance with the invention. The molybdenum supported on the alumina is then impregnated with nickel, for example as aqueous nickel nitrate and optionally also cobalt followed by drying.

The supported catalyst is then calcined in accordance with the invention at a temperature of from 1150° F. to 1300° F., preferably at a temperature of from 1150° F. to 1250° F., with the calcination temperature in most cases being about 1200° F. As hereinabove noted the use of lower calcination temperatures, as conventionally employed for supported catalysts containing nickel, does not provide an acceptable catalyst (excessive coke laydown), and temperatures above 1130° F. would not be suitable as a result of molybdenum volatility. In using the higher portions of the disclosed calcining temperatures there may be some deactivation of the nickel component of the catalyst, and as a result, in most cases the calcination temperature does not exceed 1250° F.

In accordance with another aspect of the present invention, the hereinabove described hydrotreating catalyst is employed for hydrotreating of hydrocarbon containing feedstock, which contain heavier (higher boiling components), with such feedstocks generally being characterized by at least 50% thereof boiling above 975° F. Such feedstocks are generally derived from either petroleum or coal sources, and as representative examples of such feedstocks, there may be be mentioned: heavy petroleum crudes, petroleum resides from atmospheric or vacuum distillations, shale oil, shale oil residues, tar sands, bitumen, coil tar pitches, solvent refined coal, solvent deasphalted oils, etc.

The hydrotreating of the feedstock is accomplished at conditions which are generally known in the art to be effective for upgrading of the feedstock. The catalyst is preferably presulfided. In general, the hydrotreating is accomplished at temperatures in the order of from 700° to 900° F., preferably from 750° to 850° F., and at pressures in the order of from 1000 to 35000 psig, preferably from 1500 to 3000 psig. The liquid hourly space velocity is generally in the order of from 0.05 to 2.0 hr, preferably 0.1 to 1.0 hr$^1$. The hydrogen is supplied in an amount sufficient to accomplish the hydrotreating, with such hydrogen generally being employed in an amount of from 2000 to 6000 SCF/bbl. preferably from 4000 to 5000 SCF/bbl. The selection of optimum conditions for hydrotreating of a particular feedstock is deemed to be within the scope of those skilled in the art from the teachings herein.

The hydrotreating may be effected in any one of a wide variety of reactors. Thus, for example, such hydrotreating may be effected in a fixed bed reactor, a moving bed reactor, a fluidized bed reactor, an expanded bed reactor, etc., which may contain one or more beds of the catalyst. The selection of a particular type of hydrotreating system is deemed to be within the scope of those skilled in the art from the teachings herein.

As known in the art such hydrotreating upgrades the feedstock by conversion of higher boiling components to lower boiling components. In addition, desulfurization and/or denitrogenation is also accomplished.

The invention will be further described with respect to the following example; however, the scope of the invention is not to be limited thereby:

EXAMPLE

A catalyst was prepared which is comprised of 12.0% $MoO_3$; 1.5% CoO and 1.5% NiO supported on gamma-alumina having a total porosity of 0.87–0.89 cc/g and a pore size distribution as follows:

| Pore Diameter, Å | Porosity cc/g |
|---|---|
| <250 | 0.34–0.36 |
| 250–500 | 0.14–0.15 |
| 500–1500 | 0.22–0.23 |
| 1500–4000 | 0.10–0.11 |
| >4000 | 0.04–0.07 |

The catalyst is in the form of spheres having a diameter in the order of 0.015–0.035 inch.

In one case (case A) the catalyst was calcined at 1050° F. and in the other case (case B) the catalyst was calcined in accordance with the invention at 1200° F.

Each of the catalysts was presulfided in the reactor and tested for the hydrotreating of Cold Lake Atmospheric Residue, as an ebullated catalyst bed, at 730° F., a hydrogen pressure of 2000 psig, with hydrogen being used at a rate of 5000 SCF/bbl of feed.

The case A catalyst coked up within 24 hours.

The case B catalyst in accordance with the invention operated for 35 days with the temperature eventually being raised to 820° F. The conversion rate was in the order of 60%, based on the 975° F.+ components of the feed. Thus, in accordance with the present invention, there is provided an effective hydrotreating catalyst for upgrading of heavier hydrocarbon feedstocks. The catalyst is capable of operating over long periods of time and at conversion rates of 40% and greater, in most cases in excess of 50% and in the order of 60%, based on the 975° F.+ components of the feed.

Numerous modifications and variations of the present invention are possible in light of the above teachings and, therefore, within the scope of the present invention, the invention may be practiced otherwise than as particularly described.

I claim:

1. In a process for the hydrotreating of a heavier hydrocarbon containing feedstock having at least 50% thereof boiling above 975° F. in the presence of a hydrotreating catalyst, the improvement comprising:

said hydrotreating catalyst being a catalytically effective amount of nickel and molybdenum supported on an alumina support, said catalyst having a total porosity of at least 0.5 cc/g and a pore size distribution of from 0.25 to 0.40 cc/g of pores with a diameter of less than 250° A., 0.10 to 0.25 cc/g of pores with a diameter of from 250°–500° A., from 0.20 to 0.30 cc/g of pores with a diameter of from 500°–1500° A., from 0.05 to 0.15 cc/g of pores with a diameter of from 1500°–4000° A., and from 0.03 to 0.10 cc/g of pores with a diameter of greater than 4000° A., said catalyst comprised of nickel and molybdenum supported on alumina having been prepared with calcining at a temperature of from 1150° F. to 1300° F.

2. The process of claim 1 wherein the hydrotreating is at a temperature of from 700° F. to 900° F.

3. The process of claim 1 wherein the hydrotreating is operated at a conversion of at least 50%, based on components boiling above 975° F.

4. The process of claim 1 wherein the catalyst includes from 1% to 6% of nickel and from 5% to 16% of molybdenum, by weight.

5. The process of claim 1 wherein the temperature of calcining is from 1150° F. to 1250° F.

6. The process of claim 1 wherein the total porosity of the catalyst is from 0.75 to 0.95 cc/g.

7. The process of claim 1 wherein the alumina is gamma alumina.

8. The process of claim 1 wherein the catalyst further includes a catalytically effective amount of cobalt.

* * * * *